(12) United States Patent
Barbati

(10) Patent No.: US 7,806,157 B2
(45) Date of Patent: Oct. 5, 2010

(54) TYRE BUILDING DRUM

(75) Inventor: Oreste Barbati, Rome (IT)

(73) Assignee: Bridgestone Corporation (JP)

( * ) Notice: Subject to any disclaimer, the term of this patent is extended or adjusted under 35 U.S.C. 154(b) by 897 days.

(21) Appl. No.: 11/677,064

(22) Filed: Feb. 21, 2007

(65) Prior Publication Data

US 2007/0204960 A1    Sep. 6, 2007

(51) Int. Cl.
*B29D 30/24* (2006.01)
(52) U.S. Cl. .................................. 156/415; 156/414
(58) Field of Classification Search ......... 156/414–420, 156/398, 400, 401
See application file for complete search history.

(56) References Cited

U.S. PATENT DOCUMENTS

| | | | | |
|---|---|---|---|---|
| 1,860,342 A | * | 5/1932 | Heston | 156/415 |
| 5,310,328 A | * | 5/1994 | Imai et al. | 156/415 |
| 5,755,922 A | * | 5/1998 | Baldoni et al. | 156/415 |

* cited by examiner

*Primary Examiner*—Geoffrey L Knable
(74) *Attorney, Agent, or Firm*—Sarah M. Jabbari

(57) ABSTRACT

A tyre building drum having a central shaft; two cylindrical half-drums mounted to slide along the central shaft; and a telescopic central body coaxial with the two half-drums, connecting the two half-drums, and having a tubular central member integral with the central shaft, two tubular end members integral with the respective half-drums, and an intermediate segment interposed between the tubular central member and each tubular end member; each end member is defined by the union of two semicircular end half-members connected rigidly to the half-drum by a number of first releasable fastening devices; and each intermediate segment is defined by the union of two semicircular intermediate half-segments connected rigidly to the central member by a number of second releasable fastening devices.

14 Claims, 6 Drawing Sheets

TYRE BUILDING DRUM

CROSS-REFERENCE

This application claims priority from Italian Patent Application Number TO2006A000118, Filed Feb. 21, 2006.

The present invention relates to a tyre building drum.

BACKGROUND OF THE INVENTION

From U.S. Pat. No. 4,402,783A1, a tyre building drum is known comprising a central shaft; two coaxial cylindrical half-drums mounted to slide along the central shaft; actuating members for moving the two half-drums in opposite directions along the central shaft; and a substantially cylindrical, telescopic central body coaxial with and connecting the two half-drums. The telescopic central body comprises a tubular central member integral with an intermediate point on the central shaft; two tubular end members integral with the respective half-drums; and two tubular intermediate segments, each interposed between the tubular central member and a tubular end member.

In the above known building drum, the intermediate segments only assume a precise position with respect to the half-drums and the telescopic tubular central member when the telescopic central body is fully extended or fully contracted, but are in no way position-controlled when the telescopic central body assumes an intermediate configuration, i.e. when forming the carcass and as the half-drums return to the cycle-start position. In other words, in the above known drum, no unequivocal relationship exists between the length of the telescopic central body and the position of the intermediate segments, which poses serious drawbacks, especially when forming the carcass. When forming the carcass, in fact, the half-drums move rapidly towards each other, so that nesting of the intermediate segments is likely to result in more or less serious jamming, if all the intermediate segments are moved together.

To eliminate the above drawback and ensure that a given length of the telescopic central body corresponds unequivocally to a given position of the intermediate segments with respect to the tubular central member, the tyre building drum described in Patent EPO780220B1 has been proposed.

More specifically, the two cylindrical half-drums of the building drum described in Patent EPO780220B1 are mounted to slide on the tubular central shaft, and are moved in opposite directions along the central shaft by a central screw; and each tubular end member is supported in sliding manner by the tubular central member, and moves towards the tubular central member in opposition to the thrust exerted by a number of springs.

The building drum described in Patent EPO780220B1 eliminates the drawback described, by a given length of the telescopic central body corresponding unequivocally to a given position of the intermediate segments with respect to the tubular central member.

In the known construction solutions described above, to adapt the building drum to tyres of different widths, various parts of the telescopic central body must be replaced with like parts of a different width (i.e. different axial size). More specifically, the two tubular end members integral with the respective half-drums, and the two intermediate segments, each interposed between the tubular central member and a tubular end member, must be changed.

In the known building drums described above, changing the two tubular end members and the two intermediate segments means disassembling and removing one of the two half-drums, so as to disassemble and remove a tubular end member and the corresponding intermediate segment; and then disassembling and removing the tubular central member, so as to disassemble and remove the other tubular end member and corresponding intermediate segment. Once the old parts are removed, the new parts are assembled in reverse order: a new tubular end member, a new intermediate segment, the tubular central member, another new intermediate segment, another new tubular end member, and the half-drum.

Changing the two end members and two intermediate segments as described above are complicated, time-consuming jobs, by calling for disassembly and removal of a half-drum and the tubular central member. It is important to bear in mind that, both the half-drum and the tubular central member being too heavy (at least 50-60 kg) for manual handling, disassembly/assembly calls for use of an external lifting device (hoist or crane). Moreover, disassembling/assembling a half-drum and the tubular central member subjects the threaded parts of both to considerable mechanical wear.

SUMMARY OF THE INVENTION

It is an object of the present invention to provide a tyre building drum designed to eliminate the aforementioned drawbacks, and which is cheap and easy to produce and, in particular, provides for fast, easy size change.

According to the present invention, there is provided a tyre building drum as recited in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
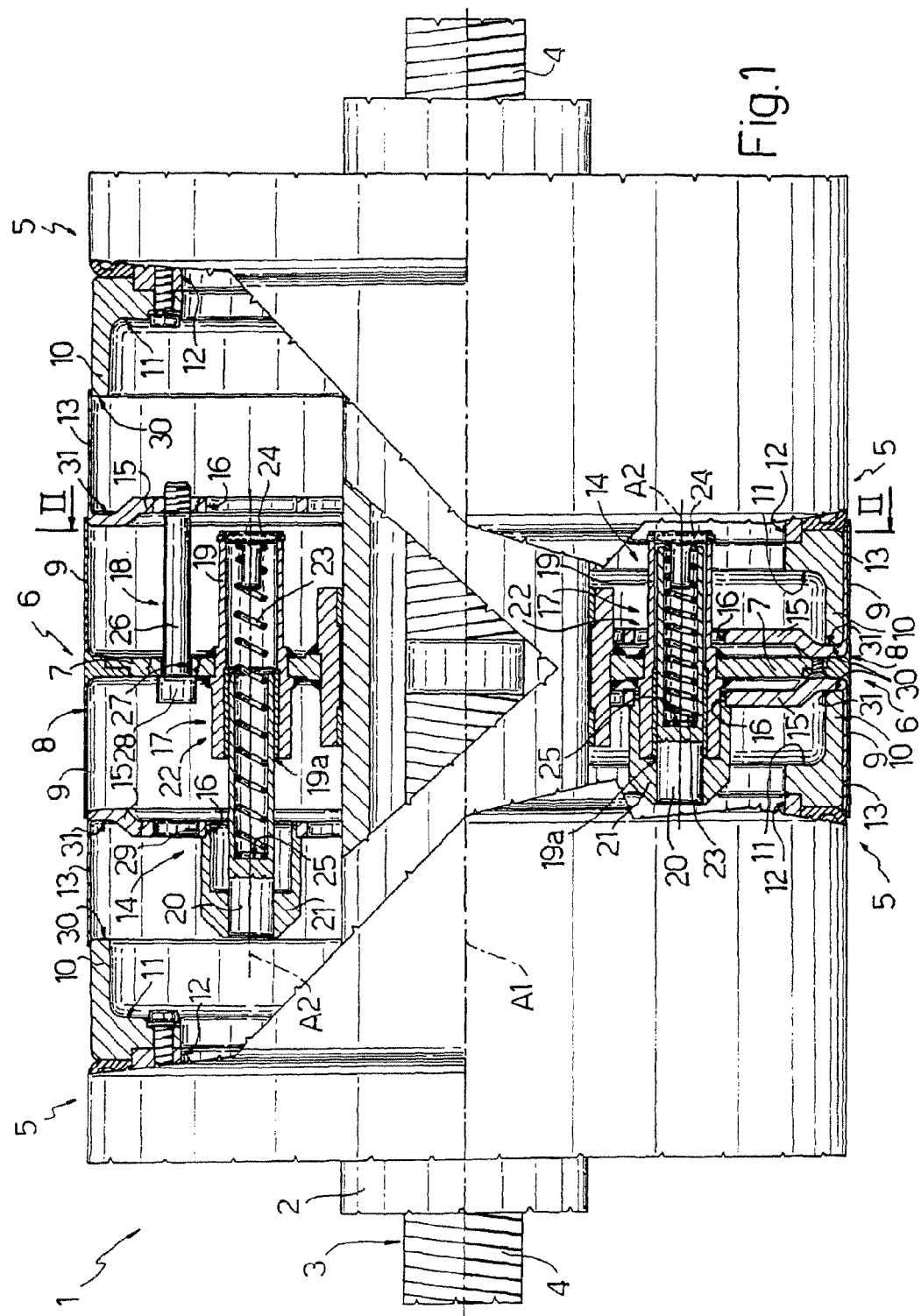
FIG. 1 shows a schematic axial half-section, with parts removed for clarity, of a central portion of a building drum in accordance with the present invention and in two different operating positions.
Figure 2:
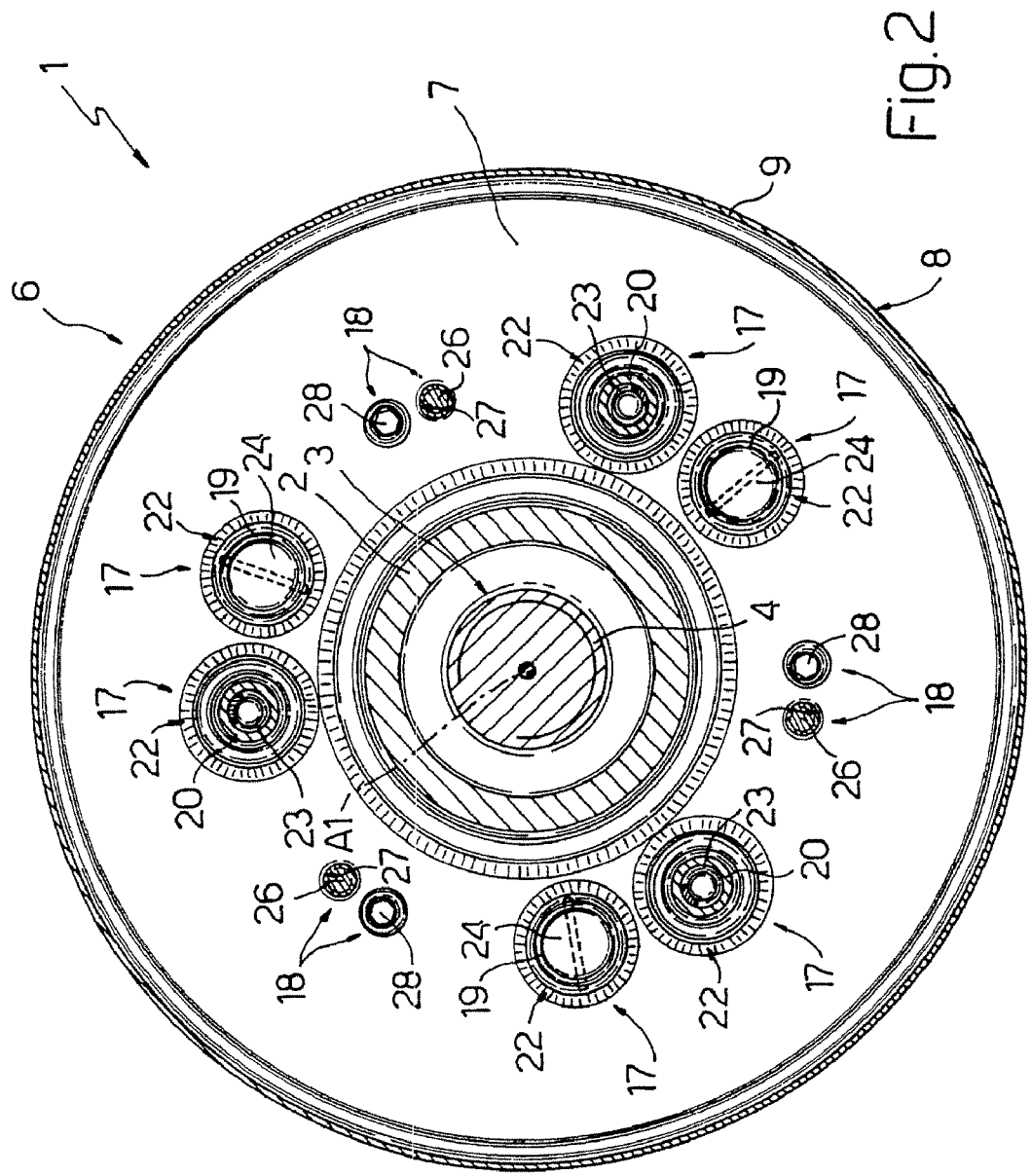
FIG. 2 shows a section along line II-II in FIG. 1.

Number 1 in FIGS. 1 and 2 indicates as a whole a tyre building drum, which rotates about an axis of rotation A1, and comprises a tubular central shaft 2 coaxial with axis of rotation A1, and an actuating screw 3 mounted to rotate inside shaft 2, coaxially with axis of rotation A1, and having two opposite threads 4 at opposite ends.

Drum 1 also comprises two cylindrical half-drums 5 mounted to slide along shaft 2, coaxially with each other and with axis of rotation A1. Each half-drum 5 has a radial anti-rotation member (not shown), which slides inside a longitudinal slot (not shown) formed through shaft 2, and is fitted at one end with a nut screw (not shown) engaging a thread 4, so that, for each turn of screw 3 about axis of rotation A1, the two half-drums 5 move in opposite directions along shaft 2.

Drum 1 also comprises a substantially cylindrical, telescopic central body 6 coaxial with and connecting half-drums 5. More specifically, telescopic central body 6 comprises an annular flange 7 fitted to an intermediate point of shaft 2; and a tubular central member 8 mounted about flange 7 and having two tubular portions 9 extending symmetrically from and on opposite sides of flange 7.

Telescopic central body 6 also comprises two tubular end members 10 integral with respective half-drums 5 and extending towards each other and towards tubular central member 8 from respective end surfaces 11, which are crosswise to axis of rotation A1, face each other and flange 7, and each have a respective annular cavity 12.

Telescopic central body 6 also comprises two tubular intermediate segments 13, which are movable with respect to both tubular central member 8 and relative tubular end members 10.

At an intermediate point between tubular central member 8 and respective tubular end members 10, the two tubular intermediate segments 13 are supported by a supporting assembly 14, which forms part of building drum 1 and comprises two annular flanges 15, each connected to one end, facing tubular central member 8, of a respective tubular intermediate segment 13. Each annular flange 15 has three pairs of holes 16, equally spaced about axis of rotation A1, and the holes 16 in each pair of holes 16 formed in one of the two flanges 15 are coaxial with the holes 16 in the respective pair of holes 16 formed in the other flange 15, and with a respective axis A2 parallel to axis of rotation A1.

Supporting assembly 14 also comprises an elastic push device 17 for setting tubular intermediate segments 13 to respective rest positions, wherein each annular flange 15 of each tubular intermediate segment 13 is separated from flange 7 by a given distance substantially equal to half the length of central member 8; and a stop device 18 for arresting intermediate segments 13 in the rest position, and preventing intermediate segments 13 from being set further than said given distance from flange 7 by push device 17.

Push device 17 comprises three pairs of sleeves 19, each of which sleeves is supported by flange 7, coaxially with a respective axis A2, and has a respective circular front opening 19a. The sleeves 19 in each pair of sleeves 19 are located substantially side by side, and extend on opposite sides of flange 7, so that opening 19a of one of the two sleeves 19 faces one of the two flanges 15, and opening 19a of the other of the two sleeves 19 faces the other of the two flanges 15.

Device 17 also comprises, for each pair of sleeves 19, two tubular rods 20 located on opposite sides of flange 7, coaxially with respective axis A2, and supported rigidly at one end by respective bells 21 engaged inside respective holes 16 of a pair of holes 16. Each rod 20 has a free end opposite the end connected to respective bell 21 and engaged in sliding manner through a respective opening 19a, and telescopically inside respective sleeve 19.

The pairs of sleeves 19 and respective rods 20 define a guide-slide device 22 for guiding intermediate segments 13, axially and in a given radial manner, as they move with respect to members 8 and 10. More specifically, intermediate segments 13 have an inside diameter larger than an outside diameter of relative end members 10, and an outside diameter smaller than an inside diameter of central member 8, so that telescopic central body 6 can be set by half-drums 5 between an extended operating position (top half of FIG. 1)—wherein intermediate segments 13 are substantially aligned along axis of rotation A1 with member 8 and respective end members 10—and a contracted operating position (bottom half of FIG. 1)—wherein intermediate segments 13 are inserted inside central member 8, and end members 10 are inserted inside intermediate segments 13. Moreover, the lengths of intermediate segments 13 and members 10 are such as to allow telescopic central body 6 to vary in length between a maximum value, and a minimum value substantially equal to the length of central member 8.

For each sleeve 19, device 17 also comprises a spring 23 mounted inside sleeve 19 and respective rod 20, and compressed between an end wall 24 of sleeve 19—located at the opposite end of sleeve 19 to the end with opening 19a—and an end wall 25 of rod 20—located at the opposite end of rod 20 to the end engaged inside respective sleeve 19. One spring 23 of each pair of sleeves 19 and rods 20 therefore assists in maintaining one of the two flanges 15 and the respective segment 13 in the respective rest position, while the other spring 23 of the same pair of sleeves 19 and rods 20 assists in maintaining the other of the two flanges 15 and the respective segment 13 in the respective rest position.

Stop device 18 comprises three pairs of pins 26, of which one pin 26 in each pair of pins 26 is integral with one of the two flanges 15, and the other pin 26 in each pair of pins 26 is integral with the other of the two flanges 15. More specifically, pins 26 extends from respective flange 15 in a direction parallel to axis of rotation A1, and in sliding manner through respective through holes 27 formed in flange 7, and each have, at a free end, a head 28 larger crosswise than respective hole 27, and which engages in sliding manner a respective further through hole 29 formed through the other flange 15.

Operation of drum 1 will now be described with particular reference to FIGS. 1 and 2, and as of said extended operating position of telescopic central body 6.

As of the extended operating position, screw 3 is turned in known manner about axis of rotation A1 to bring half-drums 5 towards each other, and both towards the intermediate point by the same amount for each turn of screw 3. As half-drums 5 move towards each other, tubular end members 10 are gradually inserted inside respective intermediate segments 13 in the respective rest positions.

When end members 10 are fully inserted inside respective intermediate segments 13, and an annular front end surface 30 of each end member 10 encounters a lateral surface 31 of respective flange 15, end members 10 begin inserting intermediate segments 13 inside respective portions 9 of member 8 and in opposition to springs 23.

Screw 3 stops turning when telescopic central body 6 reaches the contracted operating position, i.e. when rods 20 are fully inserted inside respective sleeves 19, heads 28 of pins 26 are inserted through respective holes 29, and intermediate segments 13 are fully inserted inside respective portions 9 of member 8.

It is therefore practically impossible for any sort of jamming to occur between members 8 and 10 and intermediate segments 13, seeing as how end members 10 are centred radially with respect to axis of rotation A1 by the sliding connection of respective half-drums 5 to shaft 2; intermediate segments 13 are also centred radially with respect to axis of rotation A1 by supporting assembly 14, and are accurately guided axially by guide-slide device 22; and axial movement of intermediate segments 13 only occurs upon surfaces 30 contacting surfaces 31.

Moreover, the axial movements of end members 10 and intermediate segments 13 being controlled by screw 3, and given the unequivocal relationship between the length of telescopic central body 6 and the axial position of end members 10 and intermediate segments 13, an unequivocal relative position of members 8 and 10 and intermediate segments 13 can therefore be determined.

Figure 3:
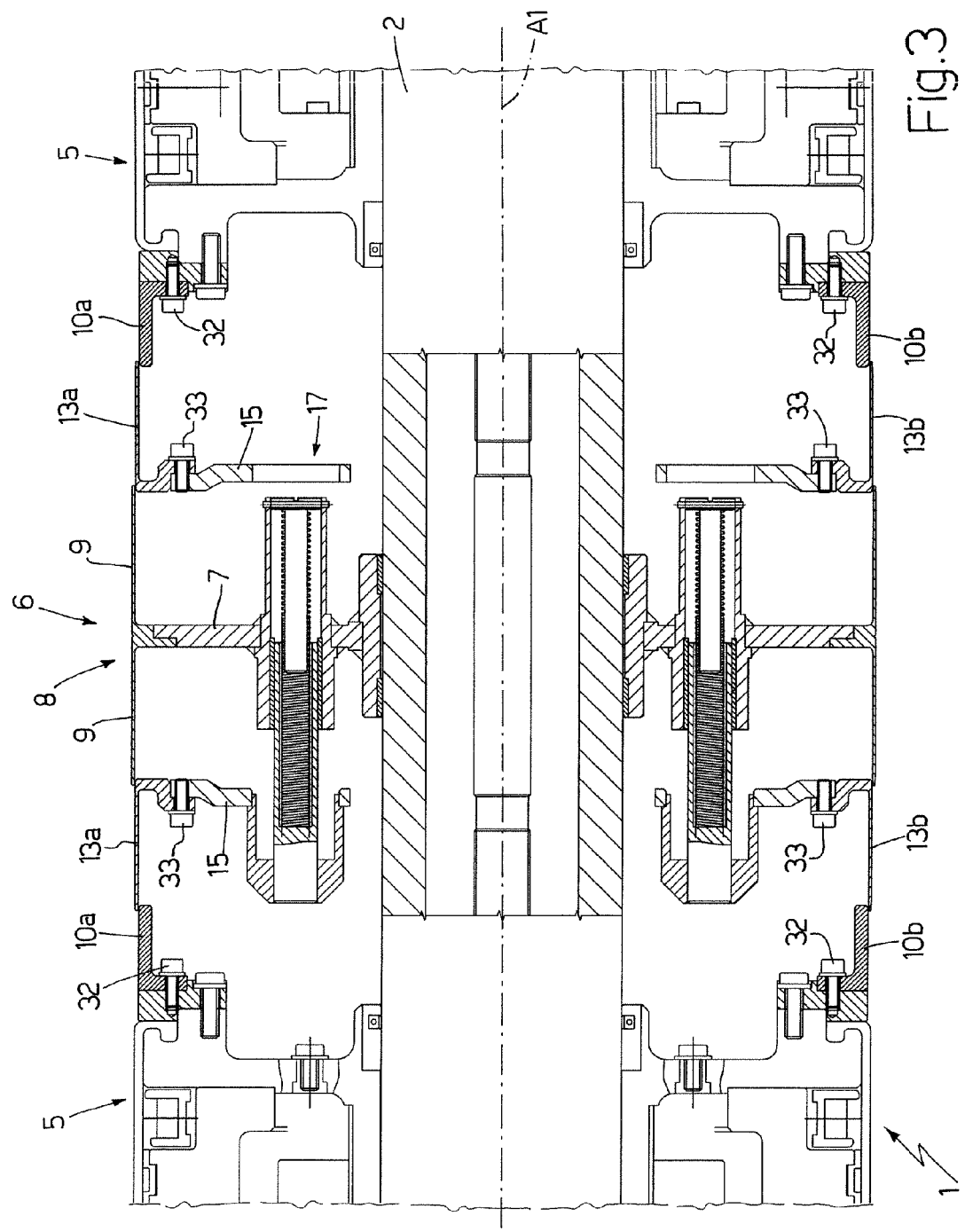
FIGS. 3 to 6 show, schematically and with parts removed for clarity, the FIG. 1 building drum at four successive size change stages.

As shown in FIG. 3, each end member 10 is defined by the union of two semicircular end half-members 10a and 10b connected rigidly to half-drum 5 by a number of screws 32 screwed inside respective threaded holes formed through half-drum 5. More specifically, each end half-member 10a, 10b is connected to half-drum 5 by four screws 32 (only one shown in FIG. 3) equally spaced along the periphery of end half-member 10a, 10b.

In the preferred embodiment shown in the accompanying drawings, the two end half-members 10a, 10b of the same end member 10 are in no way connected to each other, and are simply connected to half-drum 5 by means of screws 32. In an alternative embodiment not shown, however, the two end half-members 10a, 10b of the same end member 10 are also connected to each other by respective connecting flanges joined by screws.

In the preferred embodiment shown in the accompanying drawings, each end member 10 only comprises two end half-members 10a, 10b. In an alternative embodiment not shown, however, each end member 10 may comprise more (e.g. three or four) end half-members 10a, 10b.

In the preferred embodiment shown in the accompanying drawings, the two end half-members 10a, 10b of the same end member 10 are substantially identical and therefore interchangeable. In an alternative embodiment not shown, however, the two end half-members 10a, 10b of the same end member 10 may differ in size or in the location of screws 32, and so not be interchangeable.

As shown in FIG. 3, each intermediate segment 13 is defined by the union of two semicircular intermediate half-segments 13a and 13b connected rigidly to central member 8, in particular to annular flange 15 of supporting assembly 14, by a number of screws 33 screwed inside respective threaded holes formed through annular flange 15. More specifically, each intermediate half-segment 13a, 13b is connected to annular flange 15 by four screws 33 (only one shown in FIG. 3) equally spaced along the periphery of intermediate half-segment 13a, 13b.

In the preferred embodiment shown in the accompanying drawings, the two intermediate half-segments 13a, 13b of the same intermediate segment 13 are in no way connected to each other, and are simply connected to annular flange 15 by means of screws 33. In an alternative embodiment not shown, however, the two intermediate half-segments 13a, 13b of the same intermediate segment 13 are also connected to each other by respective connecting flanges joined by screws.

In the preferred embodiment shown in the accompanying drawings, each intermediate segment 13 only comprises two intermediate half-segments 13a, 13b. In an alternative embodiment not shown, however, each intermediate segment 13 may comprise more (e.g. three or four) intermediate half-segments 13a, 13b.

In the preferred embodiment shown in the accompanying drawings, the two intermediate half-segments 13a, 13b of the same intermediate segment 13 are substantially identical and therefore interchangeable. In an alternative embodiment not shown, however, the two intermediate half-segments 13a, 13b of the same intermediate segment 13 may differ in size or in the location of screws 33, and so not be interchangeable.

In an alternative embodiment, screws 32 connecting each end half-member 10a, 10b to half-drum 5, and/or screws 33 connecting each intermediate half-segment 13a, 13b to flange 15 may be replaced with other releasable fastening devices, such as cam fasteners.

The size-change procedure will now be described with reference to FIGS. 3-6, i.e. the operations performed to adapt building drum 1 to a tyre of different width, and which comprise replacing the two end members 10 and two intermediate segments 13 currently fitted to building drum 1 with two end members 10 and two intermediate segments 13 of a different width.

Figure 4:
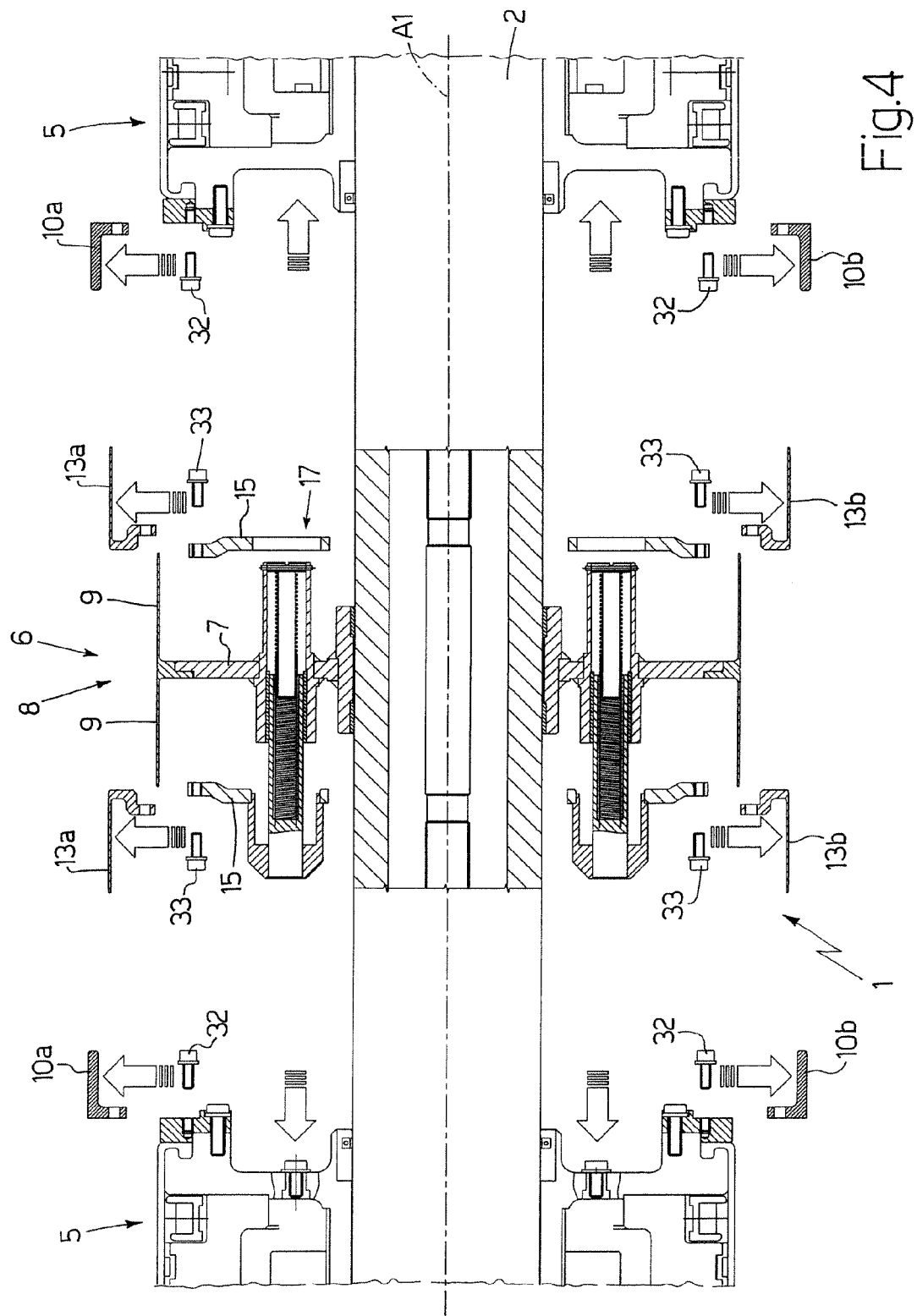

To begin with, the two half-drums 5 are set to a fully-open position, in which the two half-drums 5 are positioned a maximum distance apart and each end member 10 is separated from intermediate segment 13 to define a wide enough opening to insert a tool to unscrew screws 32 (FIG. 4). To increase the size of the opening between end member 10 and the corresponding intermediate segment 13, telescopic central body 6 may be released from and slid manually along shaft 2.

As of this position, screws 32 are removed, and the four end half-members 10a and 10b forming the two end members 10 are removed. Next, screws 33 are also removed, and the four intermediate half-segments 13a and 13b forming the two intermediate segments 13 are removed (FIG. 4).

Figure 5:
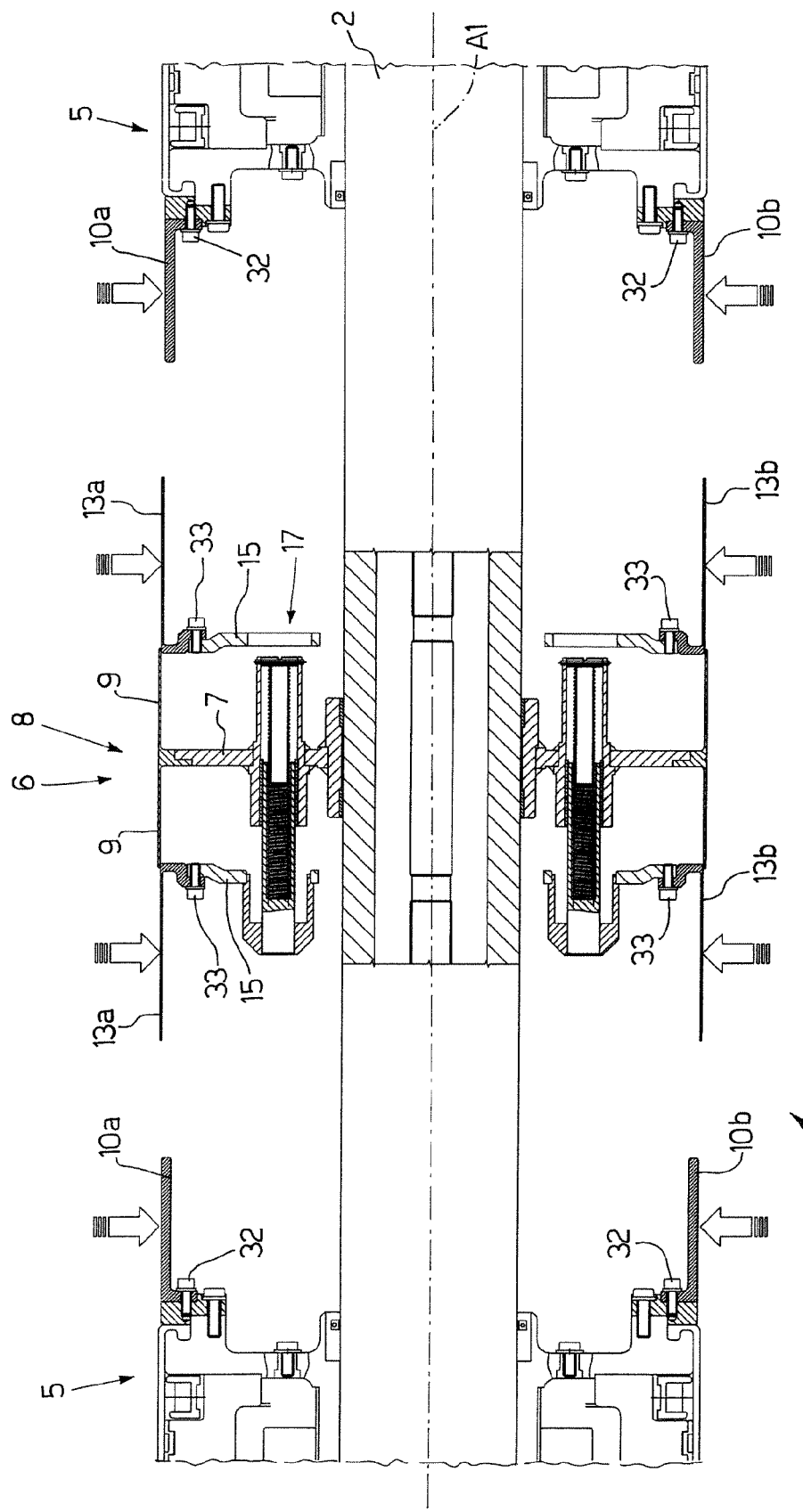

At this point, the four intermediate half-segments 13a and 13b forming the two new intermediate half-segments 13 are assembled and secured by tightening screws 33 (FIG. 5); and the end half-members 10a and 10b forming the two new end members 10 are then also assembled and secured by tightening screws 32 (FIG. 5).

Figure 6:
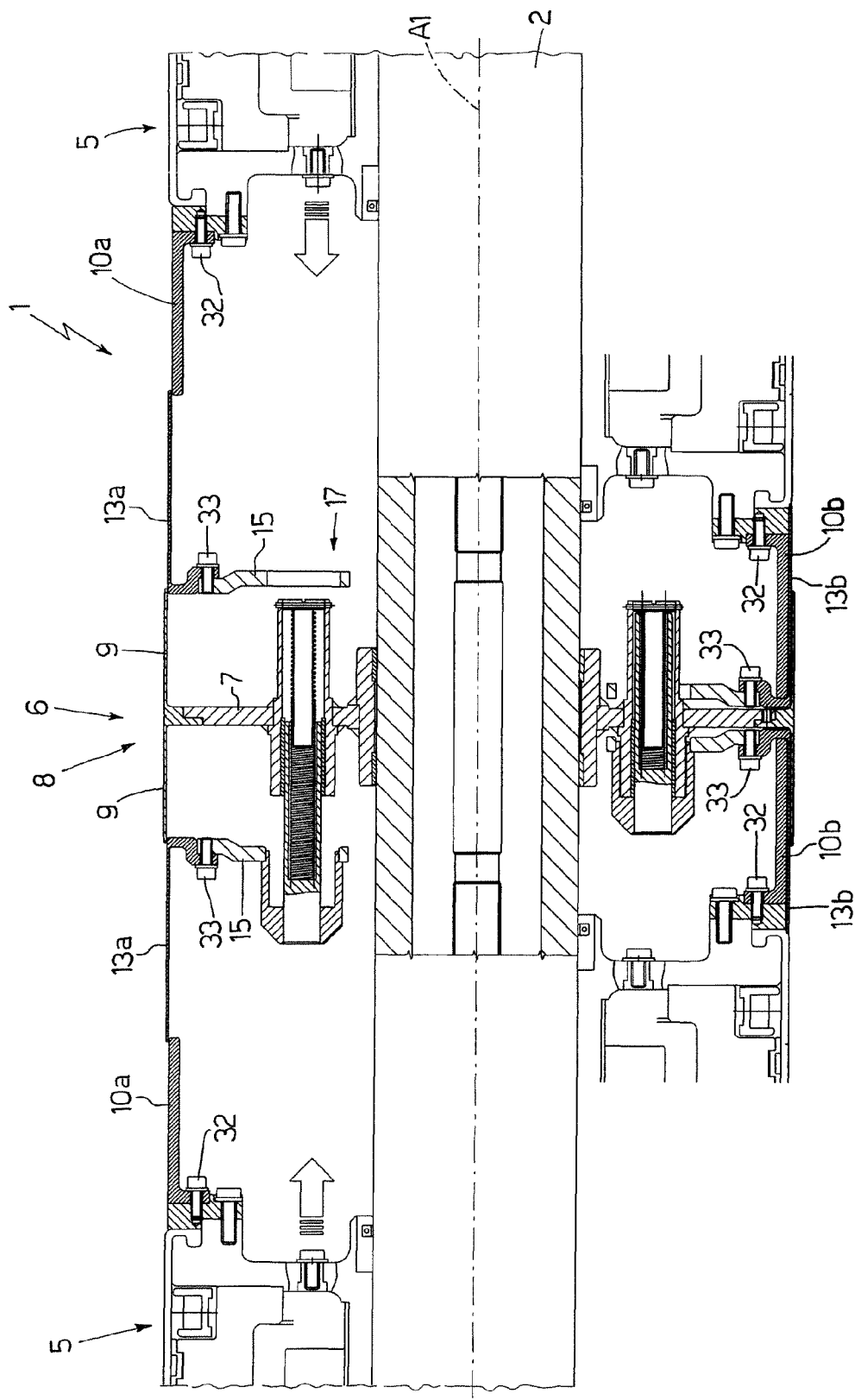

Finally, the two half-drums 5 are moved towards each other to bring each end member 10 back into contact with intermediate segment 13 (FIG. 6).

In an alternative embodiment not shown, each tubular portion 9 of tubular central member 8 fitted about flange 7 is also defined by the union of two half-portions, in the same way as described above for end members 10 and intermediate segments 13. More specifically, each half-portion of each tubular portion 9 is semicircular and connected rigidly to flange 7 by a number of screws (or other releasable fastening devices) which screw inside respective threaded holes formed through flange 7.

Building drum 1 as described above provides for extremely fast, easy size change, by not requiring removal of half-drum 5 and telescopic central body 6, which are extremely heavy and fragile. By removing only the parts that need changing, i.e. the two end members 10 and two intermediate segments 13, the size-change procedure can be performed roughly 75% faster as compared with a conventional building drum. Moreover, given the relatively light weight (roughly 5-6 kg each) of the parts to be changed, i.e. the two end members 10 and two intermediate segments 13, they can be disassembled and assembled manually, with no external lifting device required.

The invention claimed is:

1. A tyre building drum (1) comprising:
a central shaft (2);
two coaxial, cylindrical half-drums (5) mounted to slide along the central shaft (2);
actuating means (3) for moving the two half-drums (5) in opposite directions along the central shaft (2); and
a substantially cylindrical, telescopic central body (6) coaxial with the two half-drums (5), connecting the two half-drums (5), and comprising a tubular central member (8) integral with an intermediate point of the central shaft (2), two tubular end members (10) integral with the respective half-drums (5), and two substantially cylindrical intermediate segments (13) interposed between the tubular central member (8) and each tubular end member (10);
characterized in that each tubular end member (10) is defined by the union of at least two end half-members (10a, 10b) releasably connected rigidly to the half-drum (5) by a number of first releasable fastening devices (32); and
each intermediate segment (13) is defined by the union of at least two intermediate half-segments (13a, 13b) releasably connected rigidly to an inner annular flange

(15) forming part of the central member (8) by a number of second releasable fastening devices including a plurality of screws (33) which screw inside respective axially extending threaded holes formed in flange (15).

2. A building drum (1) as claimed in claim 1, wherein the first releasable fastening devices (32) comprise a plurality of screws (32) which screw inside respective threaded holes formed in the half-drum (5).

3. A building drum (1) as claimed in claim 1, wherein each end half-member (10a, 10b) is connected to the half-drum (5) by four first screws (32) equally spaced along the periphery of the end half-member (10a, 10b); and each intermediate half-segment (13a, 13b) is connected to flange (15) by four screws (33) equally spaced along the periphery of the intermediate half-segment (13a, 13b).

4. A building drum (1) as claimed in claim 1, wherein the two end half-members (10a, 10b) of the same end member (10) are not connected to each other, and are simply connected to the half-drum (5) by the first releasable fastening devices (32); and the two intermediate half-segments (13a, 13b) of the same intermediate segment (13) are not connected to each other, and are simply connected to the respective flange (15) by the releasable screws (33).

5. A building drum (1) as claimed in claim 1, wherein the two end half-members (10a, 10b) of the same end member (10) are identical and interchangeable; and the two intermediate half-segments (13a, 13b) of the same intermediate segment (13) are identical and interchangeable.

6. A building drum (1) as claimed in claim 1, wherein the two end half-members (10a, 10b) of the same end member (10) differ and are not interchangeable; and the two intermediate half-segments (13a, 13b) of the same intermediate segment (13) differ and are not interchangeable.

7. A building drum (1) as claimed in claim 1, wherein the telescopic central body (6) comprises an annular flange (7) fitted to the shaft (2), at an intermediate point along the shaft (2); the tubular central member (8) is fitted about the flange (7) and comprises two tubular portions (9) extending symmetrically from the flange (7) and on opposite sides of the flange (7); and each tubular portion (9) of the tubular central member (8) is defined by the union of two semicircular half-portions connected rigidly to the flange (7) by a number of screws which screw inside respective threaded holes formed through the flange (7).

8. A building drum (1) as claimed in claim 1, wherein the intermediate segment (13) is supported in sliding manner by the tubular central member (8), and elastic means (17) are interposed between each intermediate segment (13) and the tubular central member (8); and each intermediate segment (13) is moved by the relative tubular end member (10) towards the tubular central member (8) in opposition to a number of springs (23 (23).

9. A building drum (1) as claimed in claim 8, wherein stop means (18) are interposed between each intermediate segment (13) and the tubular central member (8) to arrest the intermediate segment (13) in a given rest position in opposition to the elastic means (17).

10. A building drum (1) as claimed in claim 8, wherein guide-slide means (22) are interposed between each intermediate segment (13) and the tubular central member (8) to guide the intermediate segment (13) in its movements with respect to the tubular central member (8).

11. A building drum (1) as claimed in claim 8, wherein the intermediate segments (13) are tubular segments, each having an inner annular first flange (15); the tubular central member (8) having an inner second flange (7); and guide-slide means (22) and stop means (18) being interposed between each first flange (15) and the second flange (7) to guide the relative intermediate segment (13) in its movements with respect to the tubular central member (8) and, respectively, to arrest the relative intermediate segment (13) in a given rest position in opposition to the elastic means (17).

12. A building drum (1) as claimed in claim 11, wherein the guide-slide means (22) comprise at least one sleeve (19) integral with one of said two flanges (7, 15) and parallel to the central shaft (2); and a rod (20) fitted to the other of said two flanges (15, 7), coaxially with the relative sleeve (19), and engaged in sliding manner inside the sleeve (19).

13. A building drum (1) as claimed in claim 12, wherein said rod (20) is a tubular rod closed by a first wall (25) at the end opposite the end facing the relative sleeve (19); the sleeve (19) having a second wall (24) at the end opposite the end facing the relative rod (20); and the elastic means (17) comprising at least one spring (23) housed inside the sleeve (19) and the rod (20), and compressed between the first and second wall (25, 24).

14. A building drum (1) as claimed in claim 11, wherein the stop means (18) comprise at least one pin (26) integral with one of said two flanges (7; 15) and parallel to the central shaft (2); a hole (27) formed in the other of said two flanges (15; 7), coaxially with the relative pin (26), and engaged in sliding manner by the pin (26); and the pin (26) projecting at a free end beyond the hole (27), and being fitted on the free end with a head (28) larger crosswise than the hole (27).

\* \* \* \* \*